United States Patent [19]

Fujii et al.

[11] 4,219,296

[45] Aug. 26, 1980

[54] AUTOMATIC STORAGE AND RETRIEVAL APPARATUS FOR INDIVIDUAL FILE FOLDERS

[75] Inventors: Tatsuo Fujii; Yoichi Tabata; Nobuyuki Oku, all of Osaka; Yoshiaki Shishido, Shiga, all of Japan

[73] Assignee: Itoki Kosakusho Co., Ltd., Osaka, Japan

[21] Appl. No.: 885,178

[22] Filed: Mar. 10, 1978

[30] Foreign Application Priority Data

Mar. 15, 1977 [JP] Japan .................................. 52-27572

[51] Int. Cl.³ ............................................... B65G 1/12
[52] U.S. Cl. ..................................... 414/273; 414/282
[58] Field of Search ...................... 214/16.4 A, 1 BB; 414/267, 269, 273, 277, 331, 330, 281, 282, 279, 280

[56] References Cited

U.S. PATENT DOCUMENTS

| | | | |
|---|---|---|---|
| 3,463,566 | 8/1969 | Powers | 214/16.4 A X |
| 3,473,675 | 10/1969 | Goldammer | 214/16.4 A X |
| 3,526,326 | 9/1970 | Castaldi | 214/16.4 A |
| 3,595,388 | 7/1971 | Castaldi | 214/16.4 A |
| 3,802,580 | 4/1974 | Castaldi | 214/16.4 A |
| 3,802,581 | 4/1974 | Frederick | 214/16.4 A |
| 3,883,008 | 5/1975 | Cataldi | 214/1 BB |

Primary Examiner—Stephen G. Kunin
Assistant Examiner—T. L. Siemens
Attorney, Agent, or Firm—Hopgood, Calimafde, Kalil, Blaustein & Lieberman

[57] ABSTRACT

Apparatus for storing and retrieving individual file folders including a pair of symmetrical shelf units, positioned face to face and having a moveable column designed to move horizontally between the shelf units. A carriage is attached to the moveable column and is designed to move vertically between the shelf units. Store or retrieve commands are placed into the system via an operations table and in response to the commands individual file folders are stored and retrieved. Individual storage and retrieval is accomplished by apparatus designed to push aside adjoining file folders to gain access to a storage position and by code marks included on the shelf units to identify individual storage positions.

8 Claims, 27 Drawing Figures

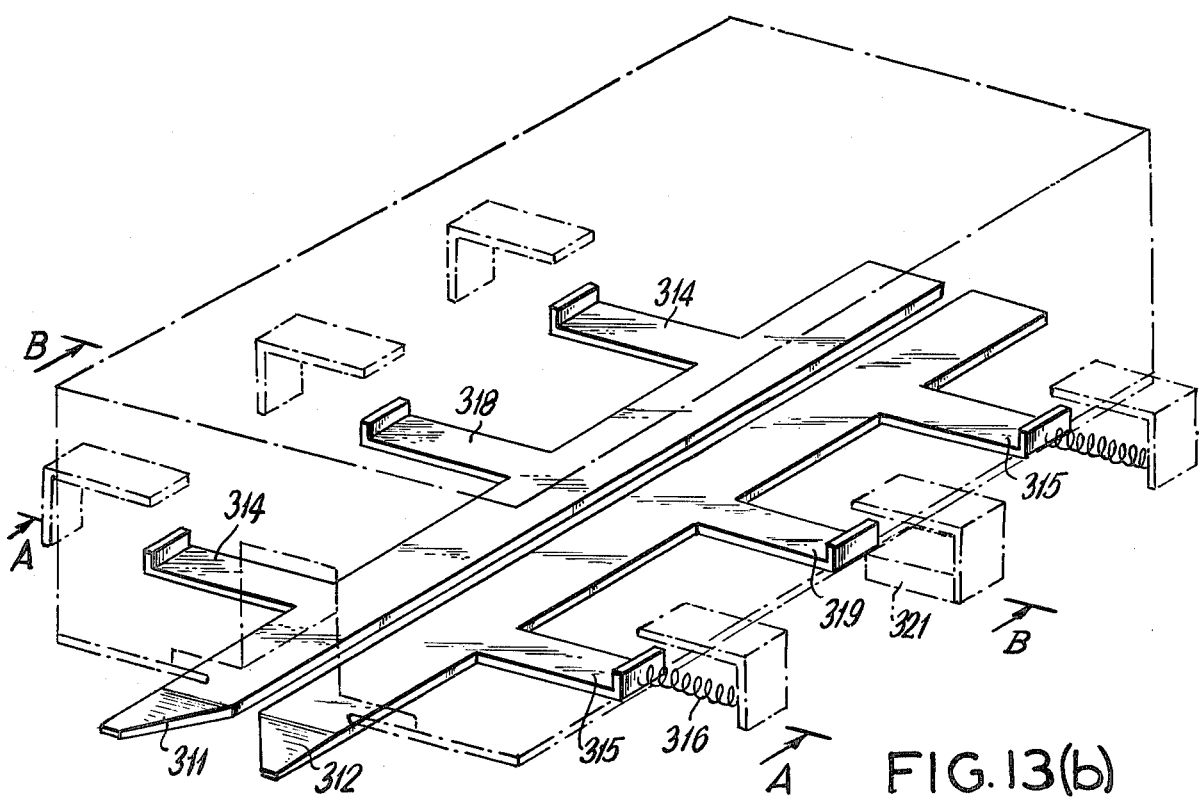
FIG.13(b)
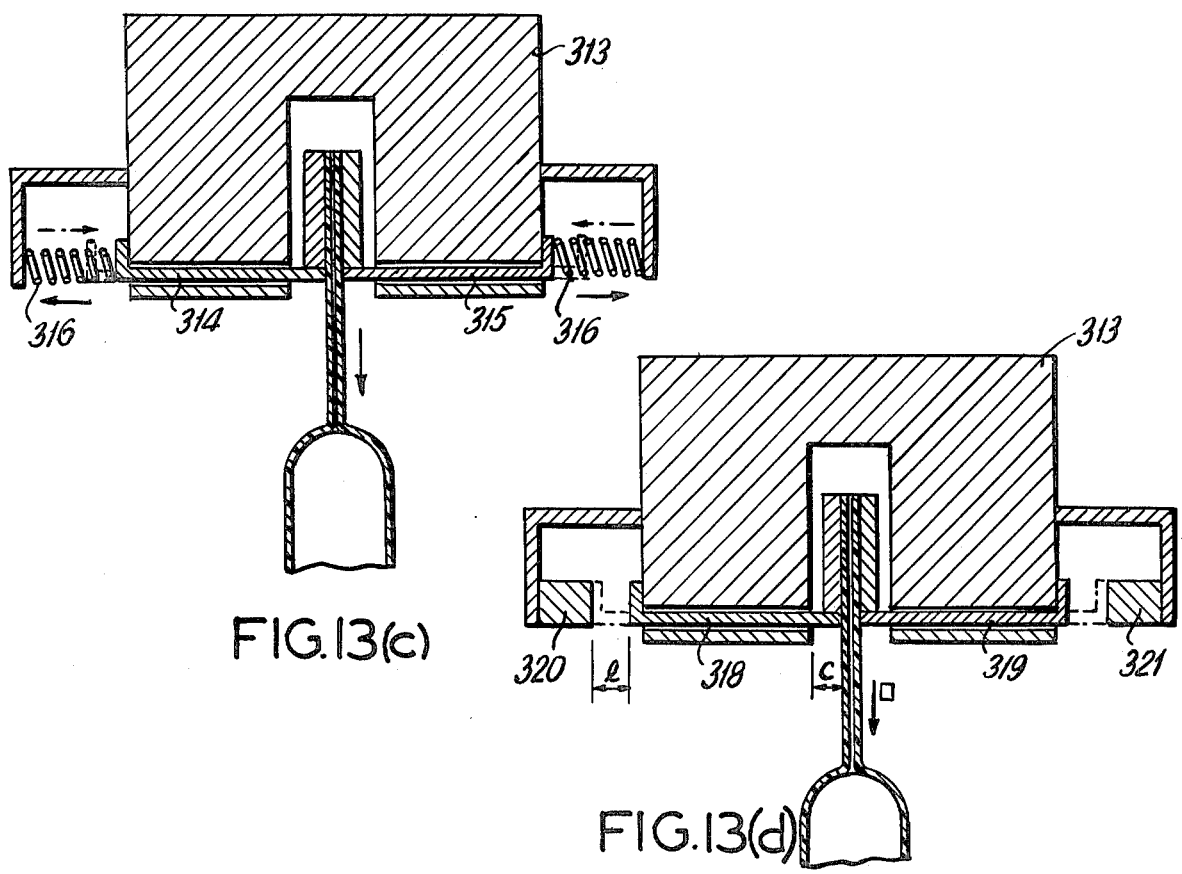
FIG.13(c)
FIG.13(d)

AUTOMATIC STORAGE AND RETRIEVAL APPARATUS FOR INDIVIDUAL FILE FOLDERS

FIELD OF THE INVENTION

This invention relates to the retrieval of thin objects such as file folders, and more particularly to automatic storage and retrieval apparatus to retrieve and store individual file folders.

BACKGROUND OF THE INVENTION

There are many known retrieval systems for locating objects accessible from a vertical plane, and for delivering the objects to a designated location. A common problem faced by such systems is how to accurately keep track of objects, such as individual file folders. This problem is encountered due to the fact that the prior art systems retrieve and store a container or a bin of file folders, to and from a designated location, instead of individually processing the file folders. Containers or bins are retrieved and stored due to the difficulty in locating individual thin objects such as file folders.

It is, therefore, an object of this invention to provide a system in which file folders are retrieved and stored individually and automatically.

It is a further object of this invention to provide automated, individual, file folder retrieval and storage apparatus having a carrier which travels from receiving and delivering areas to a designated location, stops exactly at the designated location, and thereafter pushes aside file folders, adjoining the designated file folder; on both sides, thereof, in order to exactly retrieve and relocate the folder to the designated location.

It is a further object of this invention to provide file folder retrieval and storage apparatus which has a receiving section and a delivering section to make it easier to handle file folder receiving and delivering.

SUMMARY OF THE INVENTION

In accordance with the invention there is provided a shelf unit for storing file folders. The shelf unit is equipped at regular intervals, in the horizontal direction, with file folder supporters to vertically support the file folders. A moveable carriage, moves along the face of the above mentioned shelves, and code marks are marked along the passage of the above-mentioned carriage. Each code mark corresponds to a predetermined group consisting of N file folder supporters adjoining each other in the horizontal direction. (N is a natural number selected at random, being far smaller that the number of file folder supporters lined horizontally, but larger than 1). Scanning apparatus synchronized with the movement of the carriage, is used to read the above-mentioned code marks.

Additional marks are included which correspond to a special file folder supporter included in each group of file folder supporters, and these additional marks are set on the front face of the shelves. N mark scanning devices, positioned on the carriage facing the above mentioned shelves, at the same regular intervals as those of the file folder supporters, are used to read the additional marks.

The carriage also includes file folder supporters, and file folder pulling-in apparatus positioned on the carriage to pull the file folders into the carriage file folder supporter. The carriage also includes file folder pushing-out apparatus to push the file folder on the carriage out of the carriage, and file folder pushing-aside apparatus, to push aside adjoining file folders in order to position the file folder, pushed out by the file folder pushing out apparatus exactly into corresponding file folder supporters on the shelves. The instant invention also includes first driving apparatus to move the carriage, second driving apparatus, to drive the file folder pulling-in apparatus, third driving apparatus, to drive the file folder pushing-out apparatus, and fourth driving apparatus, to temporarily drive the file folder pushing-aside apparatus in response to the movement of the file folder pushing-out apparatus.

Also included are delivering and receiving sections, an operation table for inputting "store" and "retrieve" commands and other information concerning the designated file folder, a first control circuit, to control the first driving apparatus to transport the carriage from the receiving section to the location of the designated file folder or to transport the carriage from the location of the designated file folder to the delivery section in response to input information from the operation table and output information from the scanning apparatus and the mark scanning apparatus.

There is further included a second control circuit, which controls and drives either of the above-mentioned second and third driving apparatus to pull-in or push-out the file folder according to the "store" or "retrieve" commands sent from the operation table which receives instruction signals from the control circuit.

In accordance with another aspect of the invention automated individual file folder storage and retrieval apparatus is comprised of file folder storage including two symmetrical shelf units installed face to face and each shelf unit has a plurality of shelves fixed with file folder supporters at regular intervals horizontally to hold file folders vertically. A movable column is included to move along between both shelf units.

The instant invention also includes a carriage, attached to the movable column to move vertically along movable column level indicating code marks, marked on the movable column, to indicate a level code given to each shelf, level indicating code scanning apparatus attached to the carriage to read the level indicating marks and horizontal group indicating code marks, placed at upper or lower positions of the movable column, which correspond to a group of file folder supporters, wherein each group consists of N file folder supporters adjoining each other in the horizontal direction. (N is a natural number selected at random but far smaller than the number of file folder supporters lined horizontally and larger than 1).

Also included are group indicating code scanning means attached to the movable column to read the horizontal group indicating code marks, and individual marks on the front face of the shelves corresponding to a predetermined file folder supporter indluced in the group of file folder supporters. There is further included N mark scanning devices, attached to the carriage and facing each shelf unit at the same regular intervals as those of the file folder supporters, and file folder supporters, attached to the carriage.

Included in the carriage are file folder pulling-in means, attached to the carriage to pull the file folder into the file folder supporter set on the carriage, file folder pushing-out means attached to the carriage to push the file folders on the carriage out of the carriage, and file folder pushing-aside means, attached to the carriage to push aside adjoining file folders, in order to move the file folder which is pushed out by the file folder pushing-out means into corresponding file folder supporters on the shelves.

In a second embodiment of the invention there is included, first driving means, to move the carriage, second driving means to move the movable column, third driving means to drive the file folder pulling-in means, fourth driving means to drive the file folder pushing-out means, and fifth driving means, to temporarily drive the pushing-aside means in response to the movement of the file folder pushing-out means.

A receiving section is located at the end of one of the shelf units, and a delivering section is located at the end of the other of the shelf units. An operation table is used to send in "store" or "retrieve" commands and other information concerning the designated file folder. Also included is a first control circuit to control the first and second driving means to transport the carriage from the receiving section to the location of the designated file folder or to transport the carriage from the location of the designated file folder to the delivery section in response to input information from the operation table and output information from the level indicating devices. A second control circuit controls and drives either of the third or fourth driving means in order to pull-in or push-out the file folder according to the "store" and "retrieve" information sent from the operation table which receives instruction signals from the first control circuit.

In the automated individual file folder retrieval and storage apparatus of the instant invention the delivery section includes features such as file folder supporters for delivery positioned next to the end of the shelf unit, detection means to detect whether the file folder is completely within the file folder supporter, releasing means responsive to the detection means to release the file folder for delivery, a chute to guide the file folder released from the file folder supporter to the outside of the shelf units, and a file folder gathering box attached to the end of chute opening.

The receiving section of the instant invention includes a frame body which is attached to the end of the shelf unit said frame body including, at least one opening and having file folder supporters attached to the frame, a driving means to turn the frame body so that the opening of the frame body may turn between a position facing the opening of the shelf unit end wall and a position facing the passage of the carriage.

These and other objects and features of the invention will become more apparent from the following description in conjunction with the drawings.

BRIEF DESCRIPTION OF THE DRAWINGS

FIG. 13(b) is a perspective of the main part of the file folder holding device,
FIG. 13(c) is a section view (A—A) of FIG. 13(b),
FIG. 13(d) is a sectional view (P-B) of FIG. 13(b)

DETAILED DESCRIPTION

Figure 1:
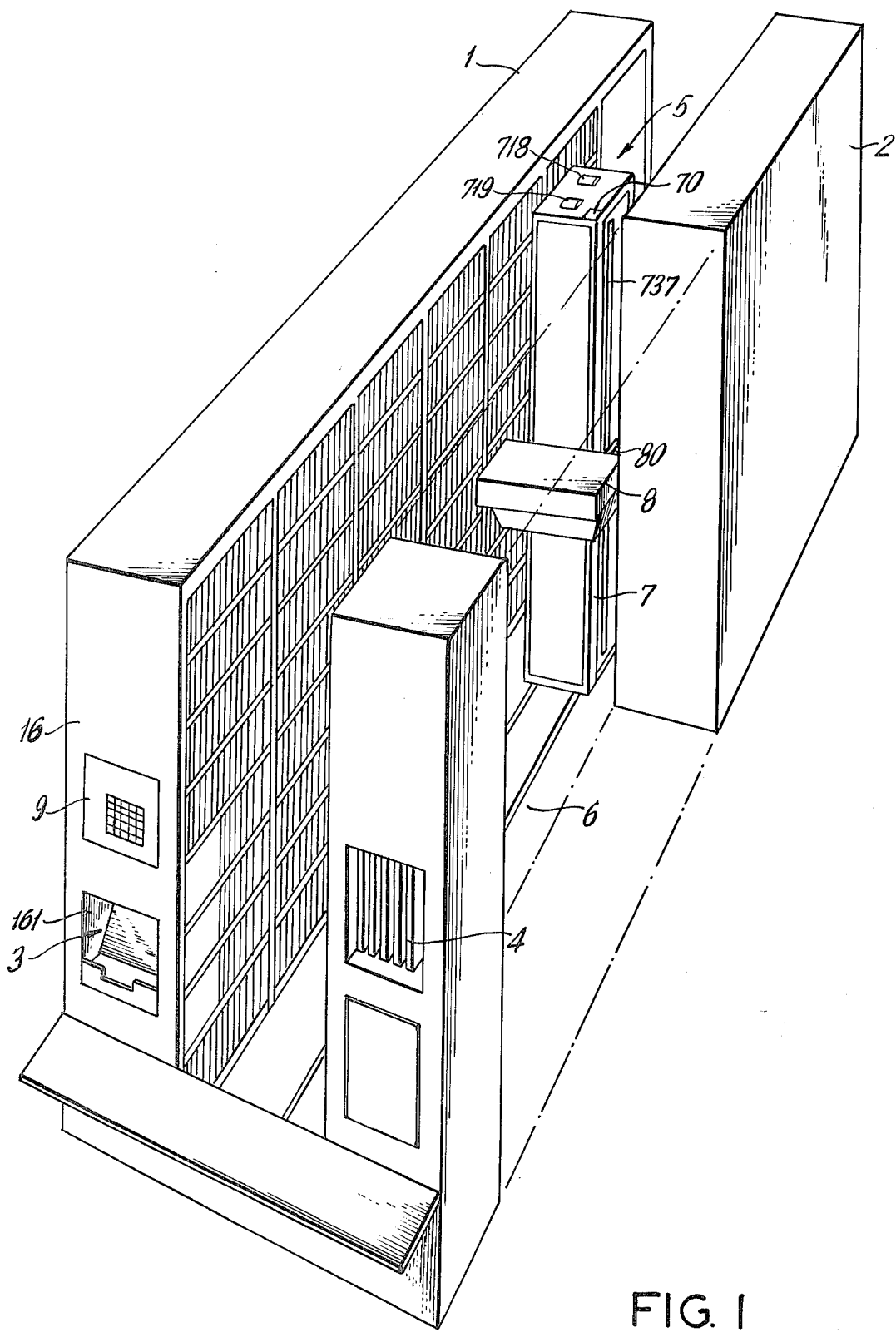
FIG. 1 an overall perspective view of the invention.

Hereinafter, we will explain this invention by taking a case having two shelf units set against each other. Refer to FIG. 1 which shows an overall perspective view of the apparatus of this invention.

The apparatus includes shelf unit 1 which has shelves on plural levels with each shelf being equipped with file folder supporters (such as rails) set at regular intervals in the horizontal direction. Shelf unit 2 is constructed symmetrically to shelf unit 1 and located opposite thereto with a certain distance therebetween.

At one end of shelf units 1 and 2 there is included delivery section 3 and at the opposite end there is included receiving section 4. Between shelf unit 1 and 2 there is included conveyor unit 5 which transports file folders between storage positions for each shelf and the above-mentioned delivering or receiving sections. Conveyor unit 5 includes movable column 7 which moves along between shelf units 1 and 2. The top and bottom of the conveyor unit is supported and guided by rail 6, attached to the floor, and another rail attached to the ceiling (not shown on the drawing). Carriage 8 is supported by column 7 and moves along the column vertically. Carriage 8 includes, as will be explained later, apparatus for pulling in file folders from the shelves and apparatus for pushing out file folders toward the shelves.

The apparatus shown in FIG. 1 functions in the following manner. Assume that code information, identifying the designated file folder, and information indicating whether retrieval or storage is desired, is put in at operation table 9. In the case of retrieval column 7 and carriage 8 will be controlled and driven so that carriage 8 will move to the stored position of the designated file folder; i.e., carriage 8 will move to the rail that holds the designated file folder. When carriage 8 stops in the position facing the designated file folder support rail, apparatus included in carriage 8 will operate to pull the file folder from the shelf towards carriage 8. After the completion of this pull-in movement, conveyor unit 5 moves to a position such that carriage 8 will face delivery section 3. Apparatus included in carriage 8 will then push the file folder out towards the delivery section.

If storage is selected, conveyor 5 will operate to move carriage 8 against the receiving section, and apparatus included in carriage 8 will operate and pull the file folder from the receiving section towards the carriage. After the completion of this pull-in movement, conveyor unit 5 moves to a position such that carriage 8 will face the designated file folder supporter and stop. Apparatus included in carriage 8 will then push the file folder out and into the designated file folder supporter, thereby completing the storage operation.

Hereinafter, a detailed explanation is given for each unit part, including the shelves, the file folder supporters, and shelf marking. More particularly, each shelf unit has shelves on plural levels in the vertical direction, as already explained in FIG. 1.

Figure 2A:
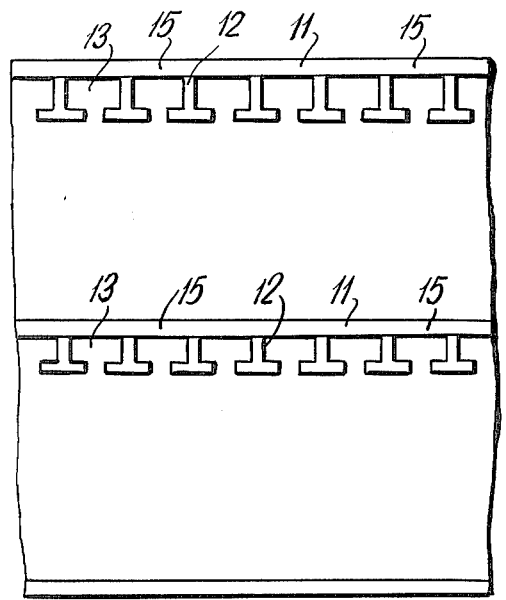
FIG. 2(a), a front view of part of a shelf unit,
FIG. 2(b), a partly enlarged perspective view of a shelf unit,
FIG. 2(c), a perspective view of a file folder,
FIG. 3, movable column's inside construction top view.
Figure 2B:
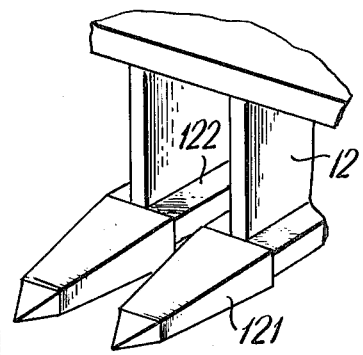
Figure 2C:
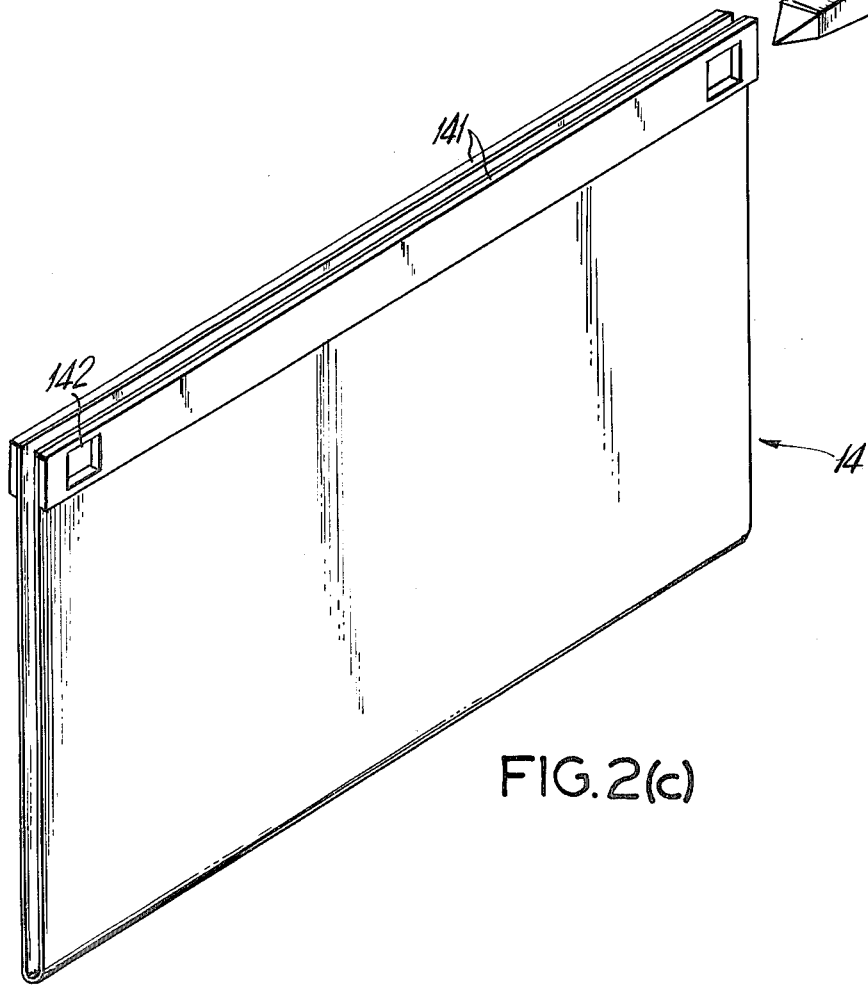

FIG. 2 (a) illustrates a partial view of two adjacent levels of shelves. Referring to FIG. 2(a), reverse T-shaped materials 12 are attached to the top shelf 11 at regular intervals in the horizontal direction. As a result, there is formed a space 13, between adjoining materials 12, which space extends to the full depth of the shelf unit. Space 13 regulates the file folder storage position.

Referring now to FIGS. 2(b) and (c) it can be seen that material 12 will form a guide rail for guiding and storing file folder 14 which has a rim 141 on both sides of the upper end thereof. As FIG. 2(b) shows, the front part of material 12, which forms a guide rail, has tapered section 121, to make a narrow rail front, so that insertion of a file folder into space 13 is easily accomplished. File folder 14 is made of soft sheet material such as vinyl, and folded in half. The upper end poritions of file folder 14 have projecting rim 141, which allows the file folder to be held on guide rail 122 formed by material 12. In this example, rim 141 has holes 142 at both ends thereof. It is to be noted that there are no walls to divide the storage space. However, to illustrate storage positions horizontal dividing walls are shown in FIG. 1.

Each shelf top plate 11 (FIG. 2(a) has a special number indicating mark 15 (hereinafter called shelf mark) which corresponds to a certain order of storage spaces among a group of storage spaces. A group of storage spaces consists of a fixed number of storage spaces (in this example 4) consisting of adjoining spaces 13 in the horizontal direction on each shelf. The grouping of storage spaces is done to simplify the allotment of location address codes of file folders and to allow accurate positioning of carriage 8.

Figure 3:
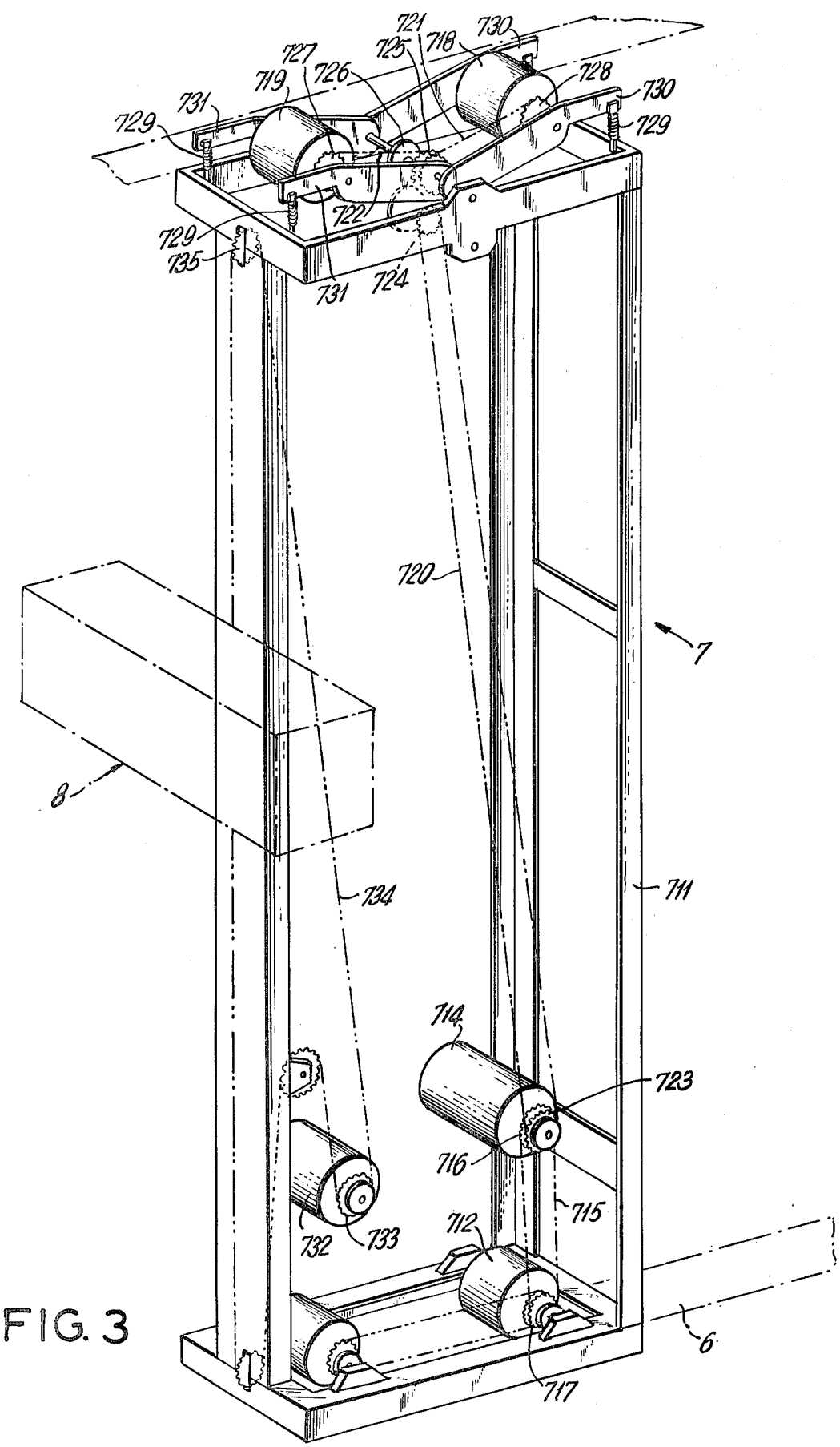

Refer now to FIG. 3 for a description of movable column 7. FIG. 3 illustrates the interior and construction of movable column 7 along with rollers 712 and 713, which are guided by rail 6 (FIG. 1) set on the floor. Rollers 712 and 713 are attached to the lower section of vertically standing frame body 711 and both rollers are attached separately front and back in the direction of movement of movable column 7. One roller 712 is connected with the drive shaft of motor 714 by chain 715, sprockets 716 and 717 so that the roller is driven by motor 714, which is fixed to frame body 711. The other roller 713 is connected to roller 712 with a chain and sprocket. It is apparent therefore that movable column 7 will move along guide rail 6 in response to the operation of motor 714.

At the upper section of the frame body, two additional rollers 718 and 719 are separately attached, front and back, and are guided by the guide rail on the ceiling. (Not shown in the drawing). Rollers 718 and 719 are connected with the driving shaft of motor 714 through chains 720, 721, 722, sprokets 723, 724, 725, 726, 727, 728, and thus are driven by motor 714. Movable column 7 is thus driven smoothly as it is supported, vertically, by both upper and lower guide rails, and the rollers rotate along both upper and lower guide rails.

Upper two rollers 718 and 719 are supported by levers 730 and 731 which are pushed up by springs 729. Therefore, when the column is placed in position, rollers 718 and 719 are pressed against the guide rail on the ceiling. Consequently, a smooth movement of movable column 7 is assured and both upper and lower rollers are always pressed against the upper and lower rails respectively, even though the distance between ceiling and floor may differ slightly from spot to spot. In addition, movable column 7 is always kept in a vertical position with respect to the floor rail.

Carriage 8 is attached to movable column 7 as previously explained, and this carriage 8 is attached to the vertical post of frame body 711 of movable column 7 such that the carriage can move up and down along the post. Another motor 732 is provided and fixed to frame body 711. A chain 734 is driven by a sprocket 733 attached to the motor shaft, and the one end is fixed to the carriage 8 through pulley 735, which is attached at the upper part of the vertical post. The other end of chain 734 is attached to the carriage 8 through pulley 736, which is attached to the lower part of the vertical post. Therefore, carriage 8 is moved up and down in response to the operation of motor 732. Naturally, a gear system (not shown) is included between the motor shaft and chain so that the carriage may remain in position when the motor stops.

Figure 4:
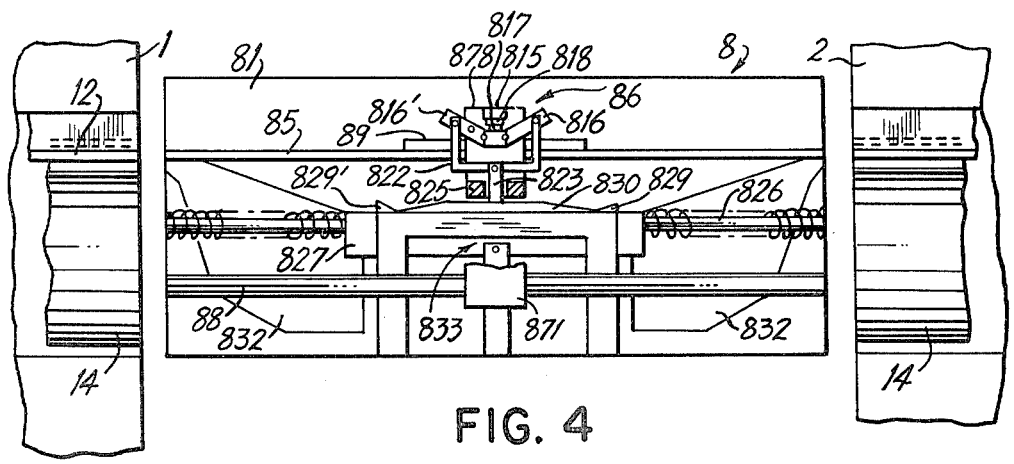
FIG. 4, carriage's cross section side view.
Figure 5:
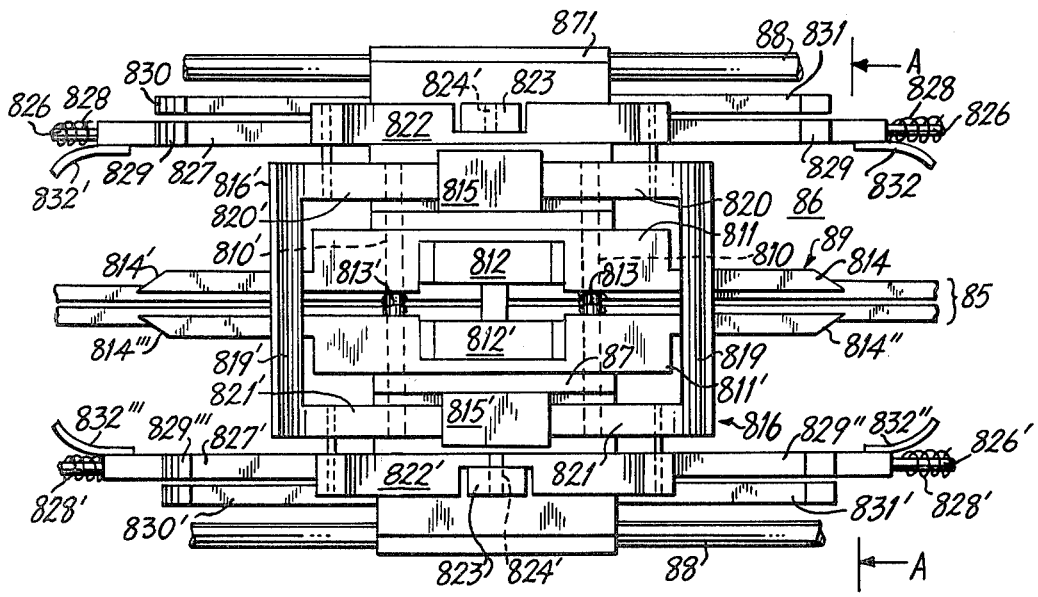
FIG. 5, main part upper view.
Figure 6:
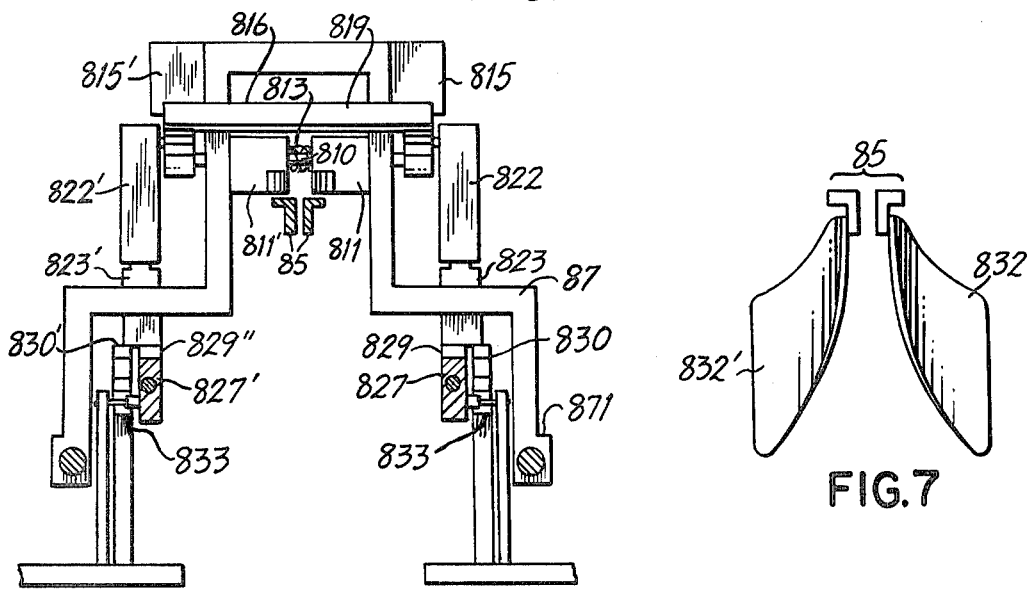
FIG. 6, cross section of A—A line of FIG. 5.

Refer now to FIGS. 4–6 for a description of carriage construction. Carriage 8 has two rails 85, to provide file folder support, which extend from one end to the other end of frame body 81, opposite to shelf units 1 and 2, to thereby support file folders 14. Carriage 8 also includes file folder pull-out and storage apparatus 86, which pulls file folder 14 out from a shelf and pushes it in to a shelf. This file folder pull-out and storage apparatus has fork-shaped frame body (w/side wall) 87 (FIGS. 5 and 6) which is mounted on rail 85. Both lower ends 871 of body 87 are supported on two guide shafts 88, which extend in opposite directions against the shelf units. Body 87 can also move left and right along the guide shafts. To move the frame body (w/side wall) 87, the rotary movement of the motor is changed into a linear movement and conveyed to the frame body by using a chain or a pulley. These features are not shown in this particular drawing.

In frame body (w/side wall) 87, file folder clamp apparatus 89 is attached directly above rail 85. The file folder clamp apparatus has two movable parts 811 and 811' which are slidably attached to fixed shafts 810 and 810'. Shafts 810 and 810' are set within frame body (w/side wall) 87 and extend in opposite directions against the shelves. Solenoids 812 and 812' are attached to parts 811 and 811' and springs 813 and 813' separate each movable part along fixed shafts 810 and 810'. Both ends of movable parts 811 and 811' are placed at the extended location of rail 85 and both ends stick out of frame body (w/side wall) 87. The ends are identified as clamping part 814, which clamps the upper end of the file folders. On the outer face of frame body (w/side wall) 87, solenoids 815 and 815' are attached and parts 816 and 816' are pivoted on the face of the frame body. Both ends of each part 816 and 816' are connected to the plunger 817 of solenoid 815 and 815'. The plunger 817 is normally pushed down by spring 818, and parts 816 and 816' are turned in such a manner so that connecting sections 819 and 819' are turned upward. Conversely when solenoids 815 and 815' operate parts 816 and 816' are turned downward.

Arms 810 and 820', 821 and 821', which are placed on the same side of framed body 87 as parts 816 and 816' are connected with U-shaped parts 822 and 822' respectively as the drawing shows. Each of U-shaped parts 822 and 822' has sliding pivot 823 and 823' positioned at the bottom of the U shape. In other words, as shown in the drawing, pin 824 and 824' are fitted into long vertical slit 825 formed on each sliding pivot 823 and 823'. Consequently sliding pivots 823 and 823' can move up and down the length of slit 825 within U-shaped parts 822 and 822'. At the opposite position of each sliding pivot 823 and 823', lower part, movable block 827 and 827' are attached so as to slide on shafts 826 and 826'. Shafts 826 and 826' are fixed outside of frame carriage 8 in such a manner that they are set in the same extended direction of rail 85.

Movable blocks 827 and 827' and supported by springs 828 and 828' from both sides and positioned in the center of shafts 826 and 826'. On the upper face of movable blocks 827 and 827', projecting parts 829', 829'', 829''' and 829'''' are equipped on both ends to receive the bottom of sliding pivot 823 and 823 when they are driven down by solenoid 815 and 815'. On the other hand, in parallel with movable blocks 827 and 827', are fixed sliding pivot guide blocks 830 and 830'. The top of the sliding pivot guide blocks is slanted downward on both sides and is flat in the middle. The height of this flat section, 831 and 831', is equal to or higher than that of projecting parts 829-829''' of movable blocks 827 and 827'. The position of flat section 831 and 831' is between projecting parts 829 and 829' and also between projecting parts 829''' and 829'''' when the above-mentioned movable blocks 827 and 827' are placed in the center of shafts 826 and 826', parallel to the rail 85.

Figure 7:
FIG. 7, shaped part, view from the side of shelf.

Each of movable blocks 827 and 827' includes shaped parts 832-832''', which stick out from the block and come close to the rail 85. Each of shaped parts 832-832''' is shaped into a wing shape at the edge and positioned so that the face is upright and vertical as shown in FIG. 4. Consequently, as seen from the side of the carriage, facing toward the shelves, as shown in FIG. 7, shaped parts 832 and 832'' ( or 832' and 832''') on both sides of rail 85, appear as a bow seen from the front. However, as shown in the drawing, both shaped parts are separated by rail 85.

Following hereinafter is a description of the folder pull-out and storage apparatus. More particularly, pulling out a folder onto the carriage is accomplished as follows. When carriage 8 is placed at the designated position, by such means as will be explained later, a motor (not shown in the drawing) is operated and drives frame body 87 toward the shelves. When frame body 87 is moved to the edge of the carriage 8, it is stopped by means, such as a limit switch, (not shown here) and, at the same time solenoids 812 and 812' will be switched on. Consequently movable parts 89 and 89' will move closer while being partially restrained by the force of spring 813'. At this time, when the pointed heads of movable parts 89 and 89' are positioned at both sides of a file folder head part, (which are supported by the designated storage place guide rail, FIG. 2 NO 122) they clamp and hold rim part (FIG. 2 NO 141) of the file folder head by clamping part 814. When this clamping motion is completed and it is detected by means of a limit switch for example, the motor is operated again to move frame body 87 to the opposite end of the carriage. There the carriage is stopped and solenoids 812 and 812' are released. Therefore it can be seen that the file folder will be moved to rail 85 on carriage 8 and will be supported by it. This concludes the pull-out motion of file folder 14 from the shelves and the pull-out position is shown in FIG. 8 (a) as a rough drawing. When movable parts 811 and 811' move closer together in response to solenoids 812 and 812', they move along fixed shafts 810 and 810' as one unit, and thus can move on the shaft in order to accurately face a file folder while holding a file folder by clamping part 814. On the other hand, if a file folder is made of a soft material, the edge of the rail is tapered so that file folder 14 can be pulled in from guide rail 122 to rail 85 even if there are some gaps between the file folders.

Figure 8A:
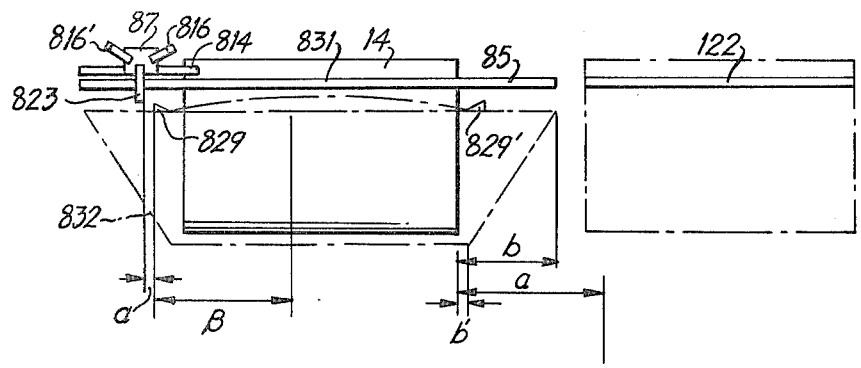
FIG. 8(a) shows the commodity on the carriage to be inserted on the shelf or after retrieval from the shelf.
Figure 8B:
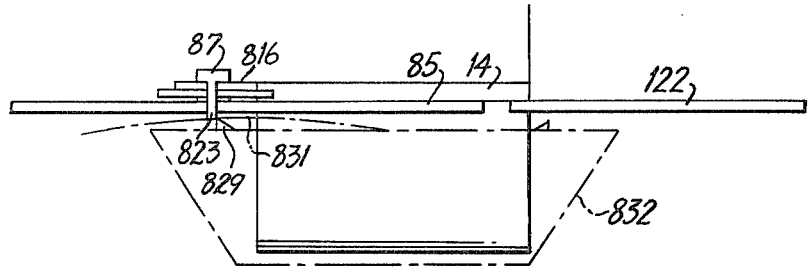
FIG. 8(b) shows the commodity being inserted into the shelf from the carriage.
Figure 8C:
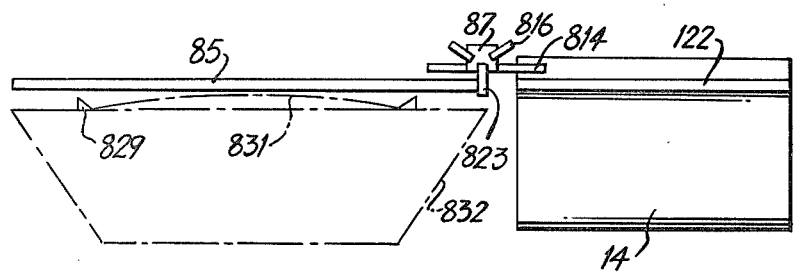
FIG. 8(c) shows the commodity on the shelf either before retrievel or after insertion,
FIG. 9, relationship of bent part and shelf when storing, top view.

Next, we will explain the storage of file folders 14, into the shelves by referring to a rough drawing in FIG. 8. To store a folder along guide rail 122 of the shelves, from the state shown in FIG. 8(a), solenoids 815 and 815' (FIG. 4–FIG. 8) will be switched on, and a motor will be operated to move the frame body. As the plunger is pulled up against the resistance of spring 818, by turning on solenoids 815 and 815', parts 816 and 816' revolve downward and the connecting part 819 (or 819') faces to the end part of file folder 14. U-shaped parts 822 and 822' also turn downward causing sliding pivots 823 and 823' to turn downward. Due to the movement of frame body 87, file folder 14 will be pushed out toward the shelves by part 816, and at the same time sliding pivots 823 and 823' will hit projecting part 829 of movable block 827 and push it toward the shelves. Therefore, shaped part 832 will move into the shelves and project into the designated storage position, thereby pushing adjoining file folders aside and preventing interference against insertion of file folder 14 into the designated storage position. This position is shown in FIG. 8(b).

Referring to FIG. 8(b), when one part of file folder 14 has moved onto guide rail 122 in the shelf, sliding pivots 823 and 823' will run on flat 831 of the sliding pivot guide block (FIGS. 4–6, NO. 830, 830'). Consequently, the connection between the sliding pivot and the projecting part of the movable block is released and therefore, the movable block, i.e., shaped part 832 will be returned to its former position by the spring. (FIGS. 4–6 NO. 826, 826'). Thereafter, frame body 87 continues to move and reaches the end of carriage 8 and places file folder completely onto guide rail 122 in the shelf and then stops. At this time, solenoids 815 and 815' will be released.

Subsequent to the placement of the file folder the motor is reversed and frame body 87 returns to the center position on the carriage. At this time, sliding pivots 823 and 823' are in a pulled-up position and thus will not again move shaped part 832. Also clamping part 814 is not in a holding condition and therefore file folder 14 will not be pulled onto the carriage. The distance "a", from sliding pivot 823 prior to the storage of file folder 14, as shown in FIG. 8(a), to projecting part 829 and of distance "b" from projecting part 829 to flat top 831, is equal to distance "a+b" shown in FIG. 8(a) and is also equal to the distance from the beginning of the storage motion to the state of the insertion of the file folder top into the storage position shown in FIG. 8(b). Distance "a" must be smaller than distance "b", i.e., the distance from the file folder edge before the storage motion, to the edge of rail 85 must be smaller than distance "b". Also, it is advantageous to place both ends of the file folder slightly backward against the lower part of the shaped material, as shown in the drawing as "b", when the file folder is supported on the carriage. The relationship "b'>a" should also be fulfilled. If the foregoing conditions are satisfied the folder is entirely contained within the shape part so that it is stored as completely as possible.

Figure 9:
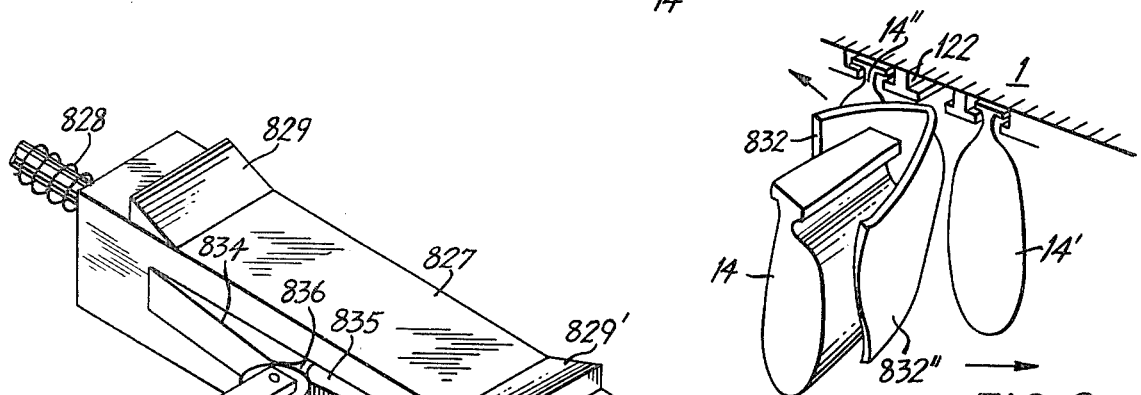

As is obvious from the above-mentioned explanation, file folder pull-out and storage apparatus 86 has a file folder pull-in and pull-out function and shaped parts 832-832''' have a pushing-aside function. Therefore, with this example, pulling-out and pushing-back for storage of a file folder on the shelves is reliably done. The apparatus is especially reliable during the storage operation, before a file folder is stored as the pushing-aside apparatus is shaped like a wedge. In other words, shaped part 832 and 832'' (or 832' and 832''') will move into the storage space, as shown in FIG. 9, by pushing aside adjoining file folders 14' and 14'', in the direction of the arrow shown in FIG. 9, so that there is no chance of interference during the insertion of file folder 14 onto the shelf. In addition, shaped parts 832-832''' are resilient and when entering into the shelves, the parts are in an opened state caused by rail 85 as shown in FIG. 7, and thus the top edges will touch each other. Thus, it becomes possible to enter directly from beneath the space between rails 122.

Figure 10:
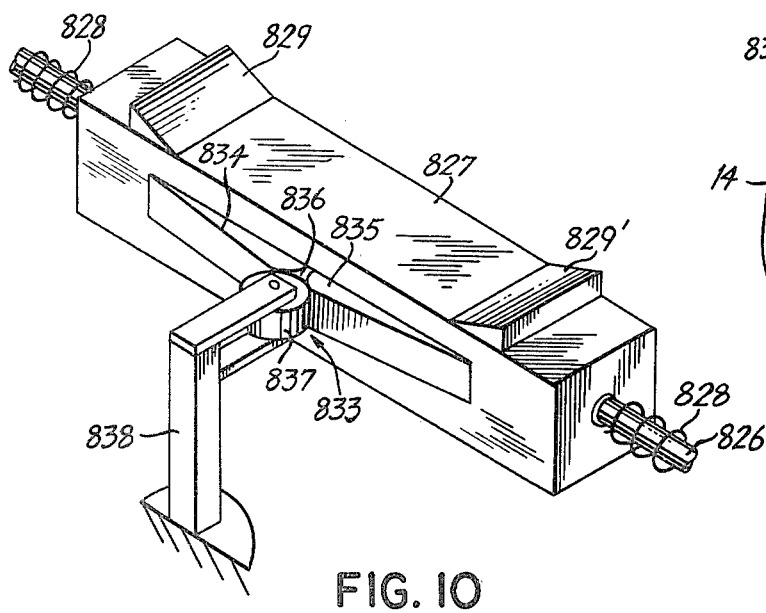
FIG. 10, movable block's vibration control construction top view.

In the construction of above-mentioned apparatus, it is advisable to have a vibration prevention function (shown in FIG. 4 and FIG. 6 as NO. 833) to prevent the vibration caused by springs 828 and 828'. The vibration occurs during the storage operation, at the time that sliding pivots 823 and 823' move on to flat part 831, and when moving block 827 and 827' and shaped part 832 and 832'' return to the central position. Referring to FIG. 10, at the side of movable blocks 827 and 827', two projecting parts 834 and 835 are set, side by side, in the direction of shaft 826. Bottom part 836 of both projecting parts is positioned in the center of shaft 826 in the direction of movable block 827 and both projection parts are symmetrically shaped from this bottom part. At the opposite position of the center position of shaft 826, in the lengthwise direction, roller 837 is attached. Roller 837 is supported by supporting board 838 and the roller face resiliently contacts the top of projecting parts 834 and 835. Consequently, roller 837 will rotate with the movement of movable block 827. Therefore, during the above-mentioned storage operation, when movable block 827 is moved back to the center position by spring 828 due to the connection release between projecting part 829 and sliding pivot 827, roller 837 will be pressed in to bottom part 836 of the projecting part and the above-mentioned vibration will be prevented.

Hereinafter, the position control of the carriage will be explained. The position control of carriage 8, in the vertical direction, is achieved by controlling motor 732 (FIG. 3) on movable column 7. Level indicating code marks, representing a level code given to each level of shelf units 1 and 2, are placed at a corresponding height against each level of shelves. The code marks are read by code mark scanning apparatus attached to carriage 8, as will be explained later. For the level indicating code marks, in this example, light reflecting tape is used and for the code mark scanning apparatus, apparatus which consists of a light source and a photocell are used. In FIG. 1, level indicating code marks are indicated by 737 and the scanning apparatus is indicated by 80. In addition, the code mark and the scanning apparatus can consist of magnetic material and a magnetized material detector. In general, either method can be used.

The horizontal, i.e., the side direction location control, of movable carriage 8 is made by code marks placed along the upper guide rail on the ceiling above movable column 7 and scanning apparatus 70 is installed on top of movable column 7 to detect the code marks. An example, of such a system is explained in U.S. Pat. No. 3,526,326. However, in said U.S. Patent, code marks and the scanning apparatus are installed on the lower part of the movable column. With this conventional method, it is difficult to position the carriage such that it is exactly facing against each storage position. Therefore, when storing or retrieving this objects, like file folders, stored densely in the horizontal direction, a positioning error can occur.

With the instant invention the file folder storage positions, lined horizontally, are divided into a plurality of consecutively numbered groups, each group is given one code and each storage position within each group is given a position code. Group indicating code marks, which indicate group codes are marked along the guide rail of the movable column. These group indicating code marks are read by the scanning apparatus installed on the movable column. Rough positioning is made at first, and then a mark is detected on the shelf corresponding to a special storage position among storage positions in each group on each level of shelves. This mark is read by the mark scanning apparatus installed on the carriage, and accurate positioning is achieved.

Figure 11:
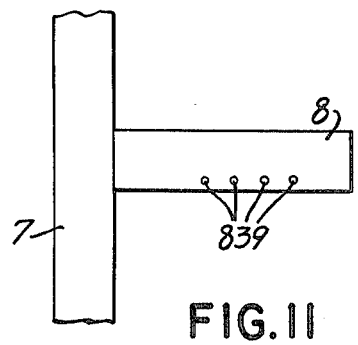
FIG. 11, carriage's rough side view to show shelf mark detection device of the carriage.

Referring to FIG. 2(a), the above-mentioned shelf mark 15 is the mark indicating a special storage position in each group of storage positions. To read these marks, in this example, four shelf mark scanners are installed on the carriage 8, on the side facing both shelf units. The scanners are installed to face each storage position of each group as is shown in FIG. 11. On the other hand, group codes (hereinafter called H address codes), given to each group, are marked along the guide rail above the movable column as coded tape and scanning apparatus is installed on the movable column to read the H address codes. This scanning apparatus is shown in FIG. 1 as 70.

Figure 12:
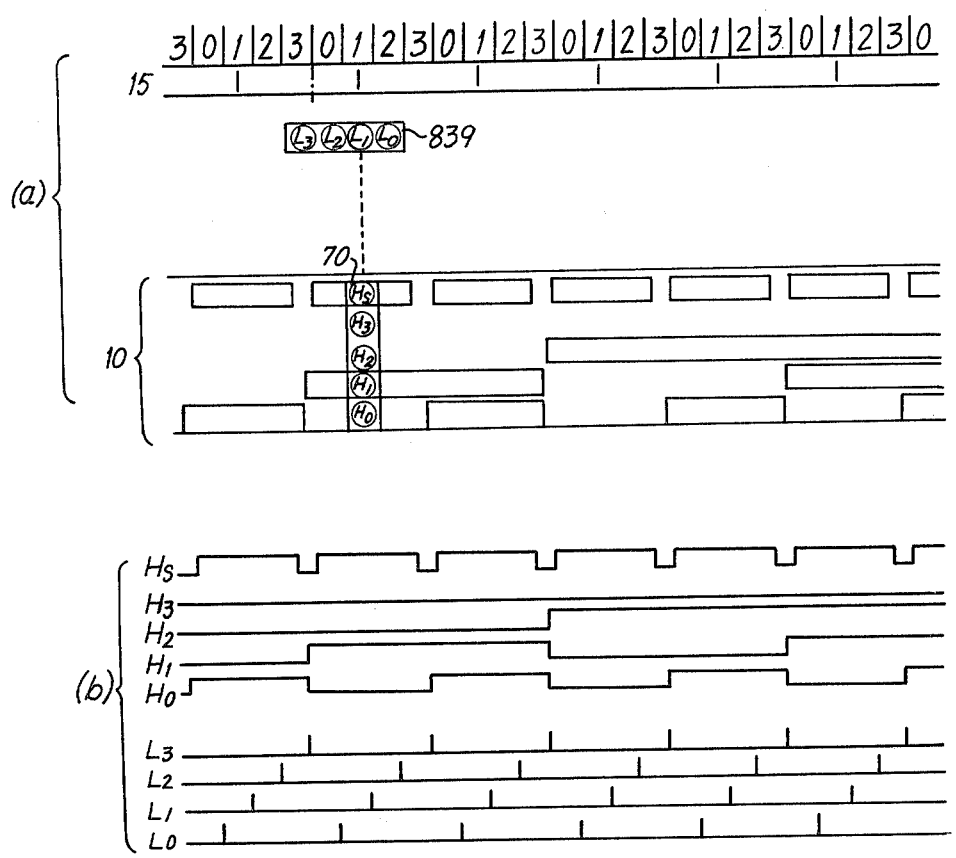
FIG. 12(a) shows the relation of the locations among the horizontal code marks affixed to the top of the shelf construction, the horizontal code mark scanning device, the code marks affixed to one of four storage positions, and their code mark scanning device.
FIG. 12(b) shows the output signals from the horizontal code mark scanning device and the specific code mark scanning device.

Referring to FIG. 12, the relationship of the following apparatus will be explained, shelf marks 15, shelf mark scanning apparatus 839, H address code marks 10, and group indicating code mark scanning apparatus 70. In this drawing, storage positions in each group are indicated by a number (hereinafter called L address code) 0, 1, 2, 3 ... from left to right. This H address code consists of 4 figures and consequently, the scanning apparatus 70 consists of 5 scanners H-0, H-1, H-2, H-3, H-S. The scanner H-S is included to read a mark showing the border line of adjoining group code marks. As shown in the drawing, one positioning mark is spread over 4 storage positions in one group. On the other hand, 4 shelf mark scanning devices (indicated by L-1, L-1, L-2, L-3) 839 are installed at the same regular intervals and in the same direction (side direction) as that of the storage positions. The scanners face the adjoining storage positions.

Now, in FIG. 12, when the carriage 3 is moved sideways, i.e., when movable column 7 is moved, information is obtained from the scanning apparatus 70 and shelf mark scanning device 839. A waveform of the information obtained is shown in FIG. 12 (b). FIG. 12(b) shows changes in information for each scanner H-0 through H-S, L-1 through L-3, when scanner 839 and the scanning apparatus is moved from left to right in FIG. 12(a). As shown in the drawing, while scanning apparatus 70 is reading one H address code mark, the scanner L-0 through L-3 produce successive output information pulses. From the condition of the output information, from each of the scanners L-0 through L-3, it is possible to determine that the carriage is facing against one of the 4 storage positions indicated by the H address code. This will become apparent from the explanation of the control system, explained later. Side direction position control of the carriage is made by controlling the motor 714 (FIG. 3) on the movable column 7, in response to comparing address codes of designated storage positions and the output information from the scanning apparatus 70 and shelf mark scanner 839.

Figure 13A:
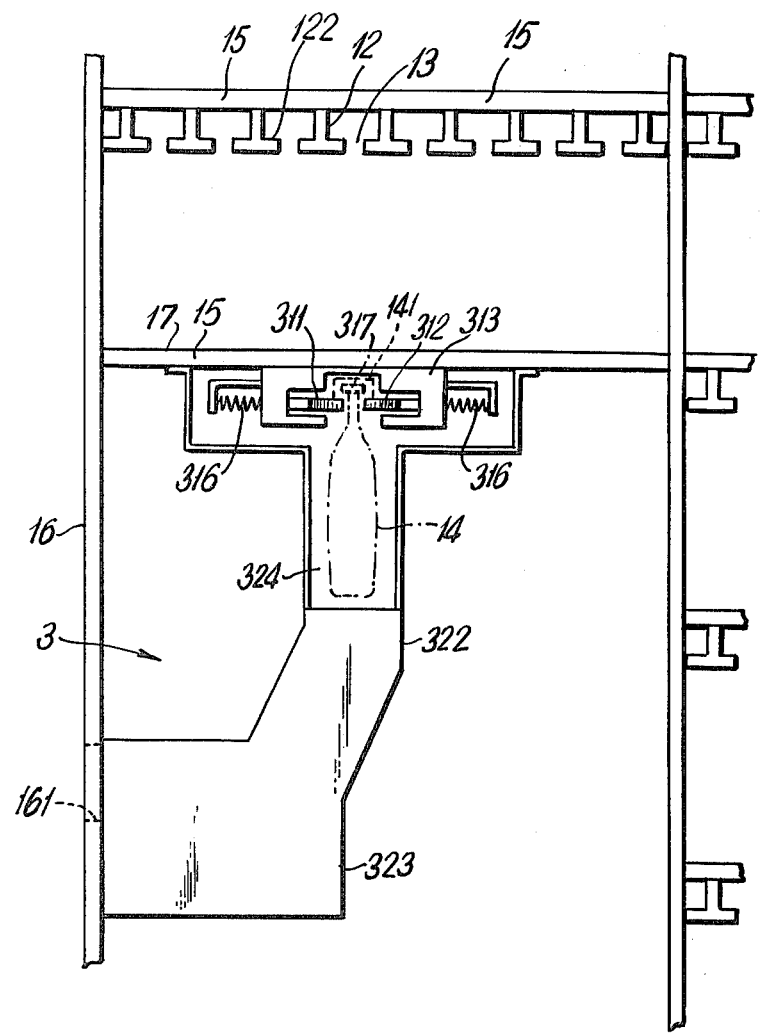
FIG. 13(a) is a front view of the delivery section construction which includes the file folder holding device located at the front end of the shelf construction and the file folder accumulating device.

The following description will detail the delivery section of the instant invention. The delivery section 3 (FIG. 1) is, as shown in FIG. 13(a), installed in a space made by partially removing three successive levels of shelves adjacent to the end wall 16 of the shelf unit 1. On the shelf 17, which is the upper part of this space, two support rails 311 and 312 are installed. File folder 14 is guided into the space between these support rails, hung by head rim 141, and supported at both support rails, i.e., support rails 311 and 312 support the file folder, in the same manner as that part 12 which is installed in the shelf for the storage of file folder 14. The two rails 311 and 312 are in turn supported by part 313 attached to shelf 17. Part 313 is U-shaped in cross section with a downward opening, thereby allowing rails 311 and 312 to slide horizontally, i.e., the rails are able to slide in the direction in which they are separated from each other to open a space therebetween.

The two support rails 311 and 312 have finger parts 314 and 315, (these are placed in front and back of parts 311 and 312) as shown in FIGS. 13(b) and (c), which penetrate 313 individually and with their edge shaped for preventing the rails from coming closer than a predetermined distance. The shaped parts receive pressure from springs 316 which are attached to material 313. Therefore, the two support rails 311 and 312 are normally positioned close together and support file folder 14, as illustrated by the dotted line in FIG. 13(a). In order to detect whether file folder 14 is completely set on both support rails 311 and 312 limit switch 317 is installed inside of the back wall of the shelf unit. The limit switch is switched on by the edge of rim 141 of file folder 14.

Referring to FIGS. 13(b) and (d), the two support rails 311 and 312 have additional finger parts 318 and 319, in parallel with finger parts 314 and 315. Parts 318 and 319 penetrate part 313 on the side thereof as do finger parts 314 and 315. Electromagnets 320 and 321 are attached to the edges of part 313.

When the above-mentioned limit switch is switched on, electric power is supplied to electromagnets 320 and 312, and as a result, both supporting rails will move in separate directions. As a result, file folder 14 will fall off from supporting rails 311 and 312. At the same time, in order to prevent folder rim 141 from hanging on to either rail, part 313's U-shaped section has a slightly wider width than the thickness of the rim. Therefore, the insertion of rim 141 into the support rails will not be prevented. and when the support rails are moved the connection of rim 141 and the support rails will be released without failure.

Positioned directly under both support rails, is chute 322. The chute is connected to the gathering box, which has a partial opening on the end wall 16 of the shelf unit. Therefore, when the file folders fall they are stacked in the gathering box via shoot 322 so that they can be removed from the opening 181 made in the edge wall 16. The chute 322 has an opening 324 at the side facing the shelf's front face to thereby allow the file folder to be removed from the carriage. In addition, it is recommended to position the slanted section of the chute before reaching gathering box 323 so that delivered file folders will be stacked in order in the gathering box. The space between support rails 311 and 312 is positioned on the same vertical line as the space 13 made between guide rails 122 of the upper and lower shelves. Also placing shelf mark 15 on the shelf 12, like the other shelves at different levels, with the above-mentioned H address code and L address code, the delivery position for support rails 311 and 312 is indicated. Of course, vertical position in indicated by the level code.

Figure 14A:
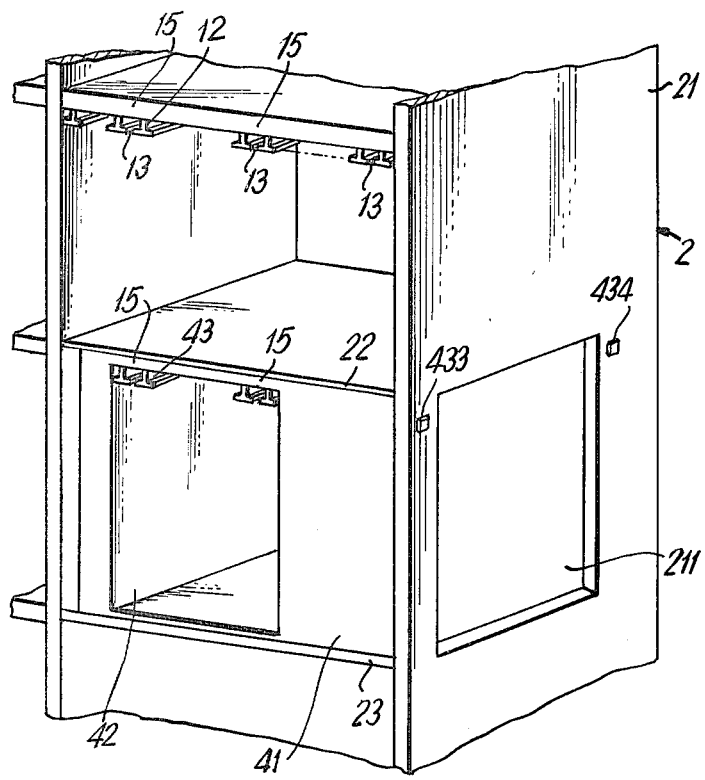
FIG. 14(a) is a perspective of the receiving section showing that the opening of the section faces the path of the movable carriage.
Figure 14C:
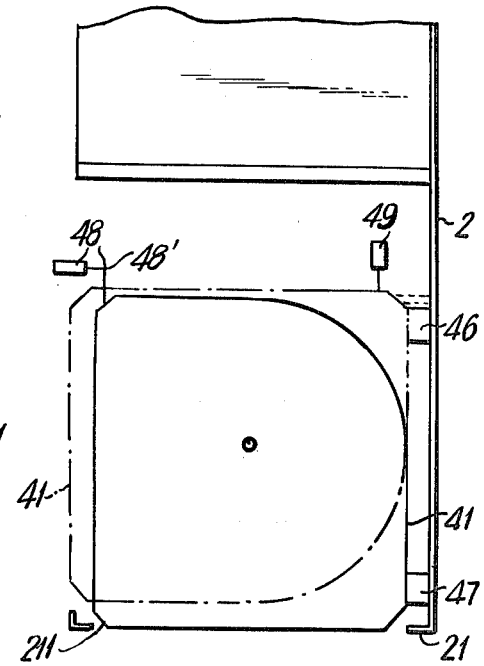
FIG. 14(c) is the plane figure of FIG. 14(a)
Figure 14B:
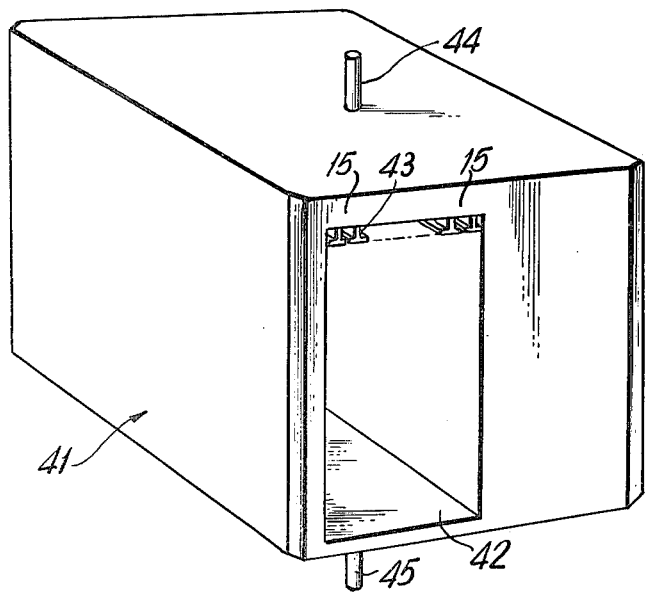
FIG. 14(b) is a perspective of the receiving section's frame.

The following description will detail the operation of the storage section. Storage section 4 (FIG. 1) is, referring to FIG. 14(a) included in one level of shelves in shelf unit 2 and has a frame body 41 installed adjoining the end wall 21 of the shelf unit 2. Frame body 41 is, as FIG. 14(b) shows, a nearly cubical box, having an opening 42 at one end, and plural support rails 43 attached in parallel and extending from the opening to the back wall. Support rails 43, have a T-shaped cross section similar to part 12, attached to the shelf. Frame body 41 is attached to shelf 22 and 23, the upper and lower shelves of the storage section, so that the body 41 can rotate. Rotating shafts 44 and 45 are shown in FIG. 14(b). Thus, frame body 41 is able to rotate, between a position where opening 42 is facing the front of shelf unit 2 (the position shown in FIG. 14(a)) and a position where it is opposite an opening made on end wall 21 of shelf unit 2. The manner of rotating body 41 is not indicated in this drawing, but can be accomplished, for example, by driving apparatus such as a motor. In FIG. 14(c), the position, in which opening 42 of the frame body is facing the opening 211 of end wall 21, is indicated by a solid line and the other position, in which the opening is facing the front of the shelf unit is indicated by a broken line, as seen from above.

Referring to FIG. 14(c), 46 and 47 are stoppers made of magnet rubber, which stop frame body 41 at either of the two above-mentioned positions. The stoppers also perform as shock absorbers when stopping the rotation from one position to another. Therefore, frame body 41, at least the portion facing magnet rubbers 46 and 47, is advantageously constructed of a magnetizing material. Two limit switches are placed in such a manner that, as shown in FIG. 14(c), the limit switch 49 will be pressed against the side wall of the frame body when the frame body stops with its opening 42 against the front of shelf unit, and limit switch 48 will be pressed by a part finger 48' when the frame body stops with its opening 42 against the opening 211 of the end wall 21. The limit switches therefore, make it possible to determine which position the frame body is in.

Figure 14D:
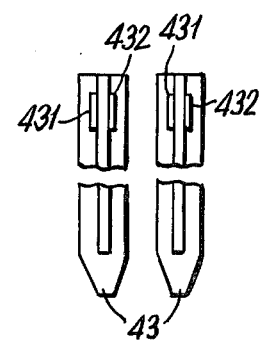
FIG. 14(d) is the plane figure of the part of the file folder holding rail which is affixed to the receiving section's frame,
FIG. 15, control system's block drawing.

Referring to FIG. 14(d), showing support rails adjoining support rails 43 in the frame body 41, light source 431 and photocell 432 are installed to detect the existence of a file folder. Therefore, in this example, when the output of photocell 432 indicates that no file folders exist in the frame body, the output of the photocell is used to operate the motor in the frame body, so that frame body 41 can be turned to the position where opening 42 will face opening 211 of end wall 21. On the other hand, when it is desired to perform a receiving operation through the opening 211, by inserting a file folder in support rail 43 in the frame body 41, switch 433 is, for instance, attached to the end wall 21, so that the frame body can be turned to face its opening against the front of the shelf unit. Similarly, even before a storage operation for a file folder in the frame body 41 is completed, or when it becomes necessary during operation, switch 434 is installed to turn the frame body to face its opening 42 against the opening 211 of end wall 21. In addition, support rail 43 of frame body 41 is, when opening 42 of the frame body is facing the front of the shelf unit, installed so that the space of support rail 43 is on the same vertical line as the space 13 made between guide rail 122 of the upper and lower levels. Also, as with the shelves of the other levels, mark 15 is placed on the upper edge of the frame opening 42. Thus, with the above-explained H address code and L address code, the file folder support position is indicated by the support rail of the frame body. Of course, the vertical position will be indicated by the level code of the shelf.

Hereinafter, the control system of the instant invention will be explained. The control system chart which controls the automatic retrieval and storage operation of the above-mentioned apparatus will be explained with reference to FIG. 15. Referring to the drawing, the data address of the position of the file folder in the shelf, is among the data keyed-in from the keyboard of the operation table (FIG. 1). The data address is converted into a code consisting of the H address code, the L address code and the level code by converter 101 and the codes are stored in buffer memory 102. Data indicating right or left shelf unit (FIG. 1, 2 or 1) and the instruction signal which determines retrieval or storage are applied to control circuit 103.

Control circuit 103 controls motor 104 which moves frame body 37 right or left on carriage 8, it operates two pairs of solenoids 812, 812', 815 and 815', it operates the delivery section's position memory device 105 and the receiving section's position memory device which stores codes indicating the position of the delivery section and the receiving section.

From the foregoing it can be seen that once an instruction signal from the operation table 9 is "stored", one continuous program will be performed. First the receiving section's position memory device 106, will give a receiving position code to the vertical and horizontal position comparing devices 107, 108 and 109. Next a stop signal will be received from the motor control circuit 110, and drive and control motor 104 and solenoids 812 and 812' will operate in order to pull a file folder on to the carriage. Next the contents of buffer memory 102 will be transferred to comparing device 107, 108 and 109 and in response thereto drive and control motor 104 and solenoid 815 and 815' will push the file folder into the shelf when the stop signal from the motor control circuit 110 is again received.

Similarly when the "retrieve" instruction is received from table 9, the control circuit will perform one continuous operation. The control circuit sends the contents of buffer 102 into comparing devices 107-109, and after receiving a stop signal from the motor control circuit 110, it drives and controls the motor 104 and the solenoid 812-812' in order to pull a file folder into the carriage. Next, by operating the delivery section's position memory device 105, it transfers the contents of the memory to the comparing devices 107-109, and after this, when it receives a stop signal from the motor control circuit 110, it drives and controls the motor 104 and solenoid 815 and 815' to push the file folder out into the delivery section.

The comparing device 107 compares the data received from the buffer memory 102, the delivery section's position memory device 105 or the level code obtained from the receiving section's position memory device 106 and the data from the scanning apparatus 80 on the carriage. Comparing device 107 transmits the compared output into the motor control circuit 110, and the motor control circuit controls and drives the motor 732 (FIG. 3) until a comparison is found. The motor control circuit sends the stop signal to the control circuit 103 through the gate circuit 115, when the motor has been stopped and a comparison has been found.

The comparing device 108 compares the H address code sent from the buffer memory, the delivery section's position memory device 105 or the receiving section's position memory device 106, with the scanning code signal, supplied from the scanning apparatus 70 through the calculating circuit 111 and the register 112, and it supplies the output to the motor control circuit 114. Comparing device 109 compares the H address code given from the buffer memory 102, the delivery section's position memory 105 or the receiving section's position memory device 106, with the output of mark scanning device 839 obtained through the calculating circuit 111 and the register 113, and then, the compared output is supplied to the motor control circuit 114.

The motor control circuit operates the motor 714 (FIG. 3) at low speed when it receives the output signal from comparing device 108, and it stops the motor 714 when receiving the output signal indicating a comparison from the comparing device 109. At the same time, the motor control circuit gives the gate signal to the gate circuit 115, and controls the delivery of the stop signal from the motor control circuit 118 to the control circuit 103.

Hereinafter, the operation of the aforementioned apparatus will be explained. When retrieving a designed file folder, the code data for the file folder (for example, an address code showing the stored position of the file folder, or a code given to the file folder), and the instruction to retrieve are keyed in at the operation table. This data is converted into a code by the converter 101 and temporarily stored in the buffer memory. Included among the code data is a code indicating right or left shelf, (this may be put in when converter 101 converts the data, without putting it in at the operation table as is shown by the dotted line in FIG. 15), and a retrieve instruction. This data is also applied to the control circuit 103. In response to the stored instructions, the contents of buffer memory 102 are applied to the comparing device 107-109, and motors 714 and 732 are operated to move movable column 7 and carriage 8. During this movement, the output of scanning devices 70 and 80 and the contents of the buffer memory 102 are compared in the comparing device 108, and when the data compares motor 714 is changed to low speed (i.e., the movement of the movable column 7 is changed to low speed). At the same time, motor 732 is stopped, i.e., the position of the vertical direction of carriage 8 is fixed. Movable column 7 continues to move at low speed until a comparison is indicated from the output of comparing device 109. At this time, carriage 8 is stopped facing the storage position (i.e., space 13 of part 12) of the designated file folder. Next, the stop signal from the motor control circuit 110 is applied to control circuit 103 via the gate circuit 115. At this time, the control circuit 103 drives the motor 104 to the right or to the left according to the direction indicating signal and frame body 87 is moved on the carriage. The designated file folder is then pulled out to the carriage.

When the operation is completed, control circuit 103 operates the delivery section's memory device 105 to transmit the memory contents to the comparing device 107-109. Because, at this time, the output of these comparing devices do not indicate a comparison, motor control circuits 110 and 114 will operate motors 714 and 732 and will stop them when a comparison is indicated. Thus, carriage 8 will be stopped at the position facing support rail 311, 312 (FIG. 13) of the delivery section.

Upon again receiving the stop signal from the motor control circuit 110, the control circuit 103 will operate solenoids 815 and 815' and motor 104, and push a file folder on the carriage into the space between support rails 311 and 312 of the delivery section. When the file folder has been completely moved in between the support rails the support rails will move in the directions previously explained, and the file folder will fall down into gathering box 323 so that the file folder can be taken out from opening 161.

The storage operation is explained by reference to FIG. 14. Assume the condition that opening 42 of frame body 41 is facing the opening 211 of end wall 21 of shelf unit 2. The file folders are inserted into the guide rail 43 of the frame body 41 succeedingly, and the data relating to the inserted file folders is placed into operation table 9. Operating switch 433, turns the frame body, and puts the stored instruction signal into operation table 9. The code data keyed in from the operation table is converted into a code by converter 101 and temporarily stored in buffer memory 102 in a first-in-first-out order. Buffer memory 102 should have sufficient capacity to record all data relating to the maximum number of file folders stored in the frame body.

Control circuit 103 operates the receiving section's position memory device 106 upon receiving the storage instruction signal, and transmits the memory contents to comparing devices 107-109. Thereafter, in the manner described above, the carriage is stopped at the position facing the first space of guide rail 43 of the frame body 41 in receiving section 4. The file folder is then pulled into the carriage by operating motor 104 and solenoids 812 and 812' as previously discussed.

When this operation is completed, control circuit 103 transmits the first code recorded in buffer memory 102 to comparing devices 107-109. In response therto movable column 7 and carriage 8 are moved and carriage 8 is positioned at the designated storage position. Control circuit 103 then operates solenoids 815 and 815' and motor 104 to push the file folder from the carriage into the designated storage position. With the completion of this operation control circuit 103 again operates the receiving section's position memory device 106 which transmits the position code of the second space of guide rail 43 in the frame body 41 to the comparing devices 107-109. Thereafter, the aforementioned operations are repeated until all file folders in the frame body 41 are stored.

Figure 15:
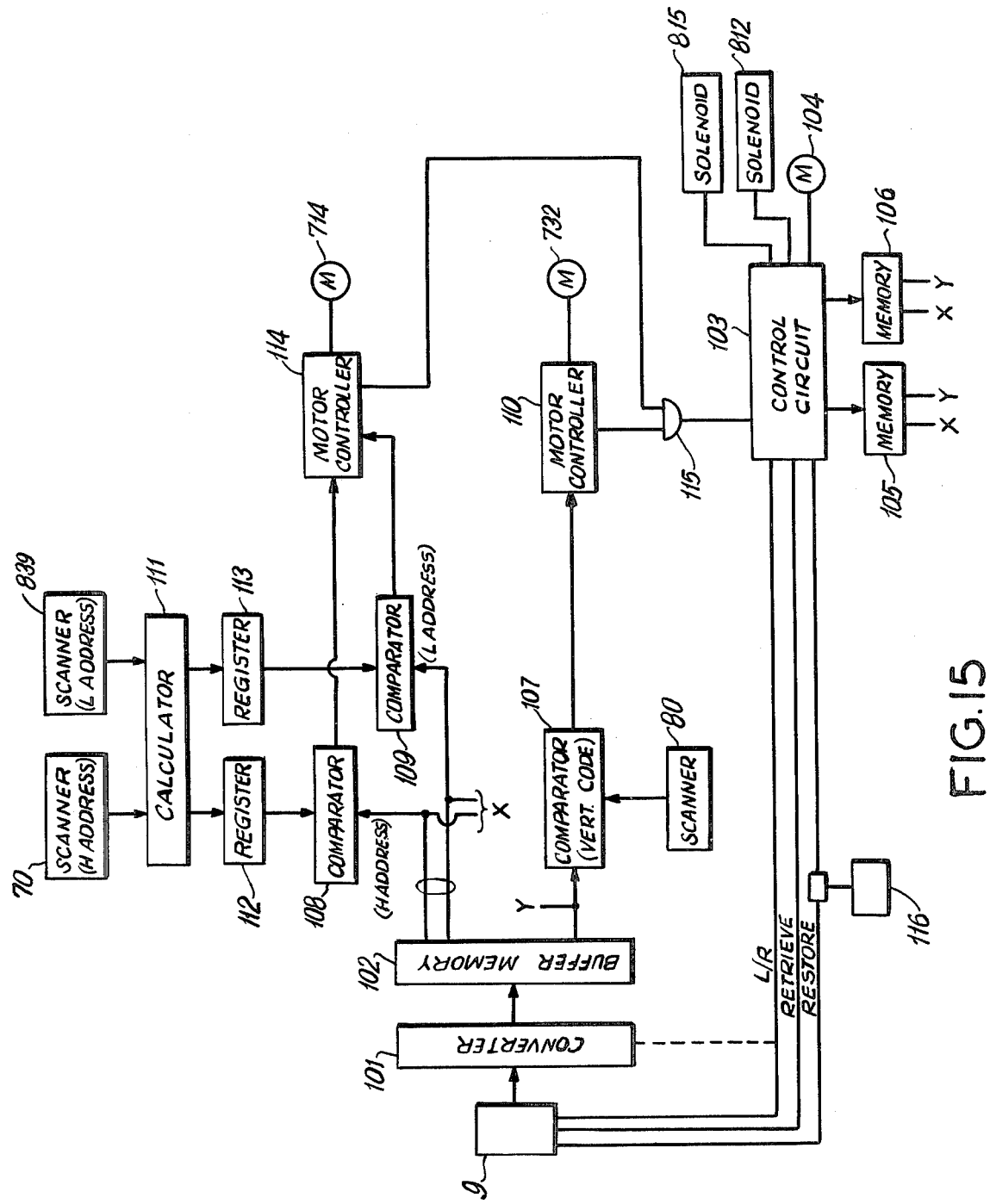

As it is obvious from the above-explanation, the receiving section's position memory device 106 records every position code of the storage positions regulated by each space made by guide rails 43 in the frame body 41, and transmits them successively to the control circuit 103. The storage instruction code, once keyed into operation table 9, is kept until every file folder in frame body 41 has been stored. This is readily done by using the output of the light source and photocell installed on the guide rail 43 in the frame body as previously explained. In FIG. 15, these photocells are indicated by 116. In addition, in order to use the apparatus efficiently, it can be made to give priority to a delivery instruction providing the storage operation is done when the delivery instruction does not have priority. This is done by setting a special section for priority demand in buffer memory 102 and by having a cut-in instruction button on the operation table. During operation, the control circuit reads the priority demand section in the buffer memory and temporarily inhibits storage.

The examples given above in explaining the invention are not intended to limit the invention in any way. More particularly, variety of design and modification of construction can be developed within the claims of the invention. For example, the positioning of the carriage in the horizontal direction i.e., the control of the movable column can be done as shown in FIG. 16.

Figure 16:
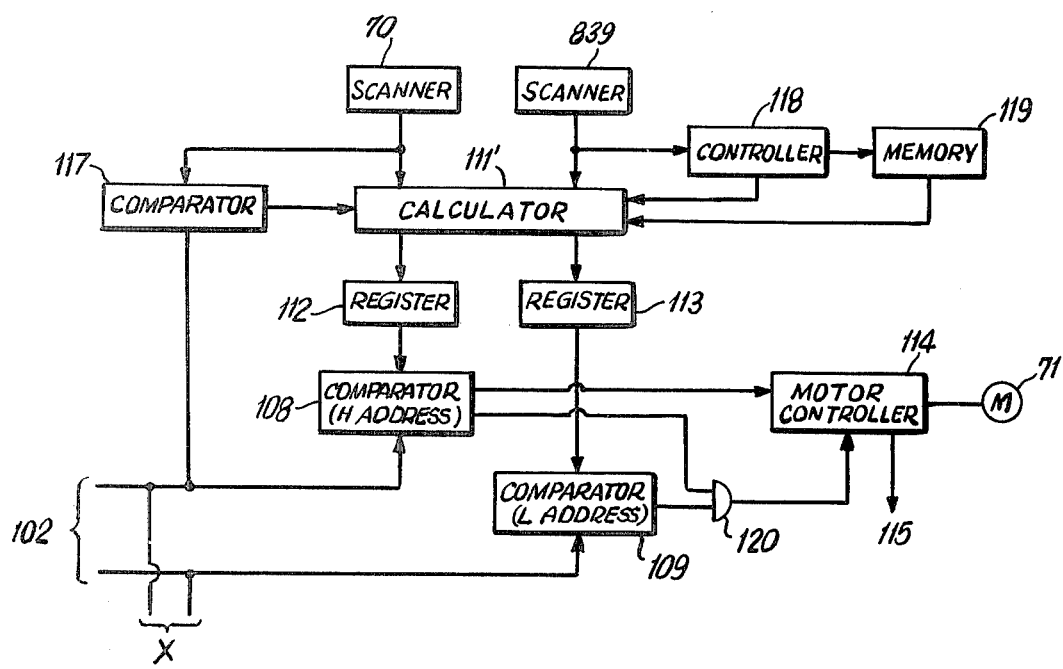
FIG. 16, control system's part modified block drawing.

Referring to FIG. 16, 117 receives H codes applied to comparing device 108 from the buffer memory.

Five address codes are obtained namely $Hk-2$, $Hk-1$, $Hk$, $Hk+1$, $Hk+2$. These codes are compared with the output of scanning device 70, and when a comparison is detected with one of the five addresses, a operation signal is transmitted to the calculating circuit 111. Calculating circuit 111' transmits the output of scanner 70 to register 112. The contents of register 112 are compared with the H address codes from buffer memory 102 by comparing device 108, and when the data does not agree the low speed operation signal is sent to the motor control circuit 114 and movable column 7 moves at a low speed.

Calculating circuit 111' writes L address codes into register 113 by receving the output from shelf mark scanning device 839.

Comparing device 109 compares the contents of the register 113 and the L address codes from buffer memory 102 and when the data agrees a stop signal is sent out.

Control circuit 118 monitors the output of the shelf mark detection device 839, (FIG. 12) and if the output of the detection device L3 is detected after the output of the detection device L2 a "1" is written into memory 119. Thereafter, if the Lo output is detected the contents of memory 119 are applied to calculating circuit 111', which adds the H address code of the register for 1 step. After the completion of this operation, the contents of memory 119 are erased. Control circuit 118 will write a "1" into the memory 119 when the output of the detection device Lo is observed after the output of the detection device L1. Thereafter, the L3 output is detected and the contents of memory 119 are placed into calculating circuit 111' which reduces the H address code from the register 112 for 1 step. After the completion of this operation, the contents of memory 119 are erased. Thus, when the contents of the register 112 and the H address code from the buffer memory 102 are found to compare the comparing device 108 keeps on a low speed signal which was sent out when a comparison was not detected. At the same time a stop signal is also sent out.

The stop signal is sent to the comparing device 109 and to the And circuit, and when both stop signals exist, a stop signal is sent to the motor control circuit 114 as the output of the And circuit 120. This stops the motor and thus the carriage is positioned at the designated storage position.

The foregoing description of the invention is illustrative and explanatory thereof and various changes in the size and shape and material as well as in the details of the illustrated construction may be made within the scope of the appended claims without departing from the spirit of the invention.

What is claimed is:

1. Automatic storage and retrieval apparatus, comprising a shelf unit for storing thin objects, such as file folders, said shelf unit, equipped at regular intervals in the horizontal direction with file folder supports, said file folder supports providing vertical support for said file folders;
   a movable carriage adapted to move along a face of said shelf unit;
   code marks, positioned along said shelf unit face, each of said code marks identifying a group of file folders, said file folder group consisting of N file folder supports adjoining each other in the horizontal direction;
   scanning apparatus for reading said code marks said scanning apparatus being synchronized with the movement of said carriage,
   individual marks identifying one of said file folder supporters included in said group of file folder supporters said individual marks being positioned on a front face of said shelf unit at said regular intervals;
   carriage file folder supporters, positioned on said carriage, file folder pulling-in apparatus positioned on said carriage for pulling said file folders into said carriage file folder supporters,
   file folder pushing-out apparatus, positioned on said carriage, for pushing said file folders contained in said carriage file folder supporters out of said carriage;
   file folder pushing-aside apparatus, positioned on said carriage, for pushing aside adjoining file folders and for placing said file folders pushed-out by said file folder pushing-out apparatus into a corresponding file folder supporter on said shelf unit;
   first driving apparatus for moving said carriage,
   second driving apparatus for driving said file folder pulling-in apparatus;
   third driving apparatus for driving said file folder pushing out apparatus,
   fourth driving apparatus for temporarily driving said file folder pushing-aside apparatus in response to the movement of said file folder pushing out apparatus;
   delivering and receiving file folder sections;
   an operation table, for inputting code information representing information concerning a designated file folder location, said information including "store" and "retrieve" commands;
   a first control circuit for controlling said first driving apparatus to transport said carriage from said receiving section to the location of said designated file folder, said designated file folder being supported by a file folder supporter, said first control circuit being responsive to said "retrieve" command for controlling said drive apparatus to transport said carriage from the location of the designated file folder, being supported by a file folder supporter, to said delivering section,
   and a second control circuit for controlling and driving said second driving apparatus and said third driving apparatus to pull-in and push-out said file folder in response to said "store" and "retrieve" commands received from said first control circuit.

2. Automated individual file folder storage and retrieval apparatus, comprising
   file folder storage consisting of two symmetrical shelf units installed face to face, each shelf unit having a plurality of shelves, each shelf having file folder supporters positioned at regular intervals horizontally, and said file folder supporters adapted to hold file folders vertically;
   a movable column adapted to move horizontally along between said facing shelf units,
   a carriage attached to said movable column adapted to move vertically along said moveable column;
   level indicating code marks, marked on said movable column, for indicating a level code given to each shelf of said shelf units, said code marks designating a location corresponding to the level of said code marks;
   level indicating code scanning apparatus positioned on said carriage for reading said level indicating code marks;
   horizontal group indicating code marks, placed at an upper and lower portion of said movable column and along said column's horizontal passage, said horizontal code marks corresponding to a group of file folder supporters, each group consisting of N file folder supporters adjoining each other in the horizontal direction;
   group indicating code scanning apparatus positioned on said movable column for reading said horizontal group indicating code marks, individual marks positioned on a front face of said shelves corresponding to one file folder supporter included in said group of file folder supporters;
   N mark scanning devices positioned on said carriage for reading said individual marks, and facing each of said shelf units at said regular intervals,
   carriage file folder supporters positioned on said carriage,
   file folder pulling in apparatus positioned on said carriage for pulling a file folder into said carriage file folder supporter, file folder pushing out apparatus positioned on said carriage for pushing a file folder on said carriage out of said carriage file folder supporter, file folder pushing-aside apparatus, positioned on said carriage for pushing-aside adjoining file folders, and for placing said file folders pushed out by said file folder pushing-out apparatus into a corresponding file folder supporter on said shelves, first driving apparatus for moving said carriage, second driving apparatus for moving said movable column, third driving apparatus for driving said file folder pull-in apparatus, fourth driving apparatus for driving said file folder push-out apparatus, fifth driving apparatus for temporarily driving said file folder pushing-aside apparatus in response to the movement of said file folder push-out apparatus;

a receiving section located at an end of one of said shelf units, a delivering section, located at an end of the other of said shelf units, an operation table for inputting code information concerning a designated file folder, said code information including a "store" and a "retrieve" command, a first control circuit responsive to said "store" command, to said code scanning apparatus, and to said mark scanning devices for controlling said first driving apparatus and said second driving apparatus to transport said carriage from said receiving section to the location of the designated file folder being supported by a file folder supporter, said first control circuit responsive to said "retrieve" command, to said code scanning apparatus, and to said mark scanning devices to transport said carriage from the location of the designated file folder being supported by a file folder supporter to the delivery section, and a second control circuit for controlling and driving said third driving apparatus and said fourth driving apparatus to pull-in and push-out a file folder in response to said "store" and "retrieve" commands received from said operation table in response to an instruction signal received from said first control circuit.

3. Automated individual file folder storage and retrievel apparatus in accordance with claim 2, wherein said delivery section includes delivery file folder supporters positioned next to an end of said shelf unit, means for detecting whether a file folder is completely within said delivery file folder supporter;

means responsive to the detecting means for releasing said file folder from said delivery file folder supporter, a chute for guiding the file folder released from said delivery file folder supporter to the outside of said shelf units, and a file folder gathering box positioned at an end of said chute for holding file folders.

4. Automated individual file folder storage and retrievel apparatus in accordance with claim 2 wherein said receiving section includes a frame body positioned at an end of said shelf unit, said frame body having at least one opening, file folder supporters attached to said frame body, and driving apparatus for turning said frame body so that the opening of the frame body may turn between a position facing the opening on the shelf unit's end wall and a position facing the passage of said carriage.

5. Automated individual file folder retrieval and storage apparatus in accordance with claim 2, wherein said movable column includes separated front and rear lower rollers attached to the lower part of said column for guiding said column in cooperation with a guide rail positioned beneath said movable column, separated front and rear upper rollers attached to the upper part of said column for guiding said column in cooperation with a guide rail positioned above said column, levers supporting said upper rollers, and spring means for pushing up said levers so that said upper rollers are pressed against said upper guide rail.

6. Automated individual file folder retrieval and storage apparatus in accordance with claim 2, wherein each shelf file folder supporter and each carriage file folder supporter consists of two separately installed rails, each file folder including a projecting part on both sides thereof, said projecting part being guided onto said rails, whereby said file folder is supported.

7. Automated individual file folder retrieval and storage apparatus in accordance with claim 6, wherein said two rails include a top end slanted to make a rear space between the two rails narrower than a front space.

8. Automated individual file folder retrieval and storage apparatus in accordance with claim 4, wherein said receiving section includes file folder detection means for detecting the existence of a file folder in the file folder supporters installed in said receiving section of the frame body, an input key switch for sending information to turn said frame body to face its opening against said moving carriage passage;

a first control circuit to operate said driving apparatus in response to the information from said input key switch, a second control circuit responsive to the absence of output information from said detection means for operating said driving apparatus to turn the frame body to face its opening against the opening of said shelf unit.

* * * * *